United States Patent
Renke et al.

(10) Patent No.: US 10,533,362 B2
(45) Date of Patent: Jan. 14, 2020

(54) SYSTEMS AND METHODS FOR MEMORY AND TOUCH POSITION WINDOW

(71) Applicant: GM GLOBAL TECHNOLOGY OPERATIONS LLC, Detroit, MI (US)

(72) Inventors: David T. Renke, Macomb, MI (US); Michael A. Faucett, Jr., Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 136 days.

(21) Appl. No.: 15/624,954

(22) Filed: Jun. 16, 2017

(65) Prior Publication Data

US 2018/0361954 A1    Dec. 20, 2018

(51) Int. Cl.
| | |
|---|---|
| *E05F 15/695* | (2015.01) |
| *E05F 15/689* | (2015.01) |
| *B60J 1/17* | (2006.01) |
| *B60J 1/18* | (2006.01) |

(52) U.S. Cl.
CPC .......... *E05F 15/695* (2015.01); *E05F 15/689* (2015.01); *B60J 1/17* (2013.01); *B60J 1/1846* (2013.01); *E05Y 2400/32* (2013.01); *E05Y 2800/75* (2013.01); *E05Y 2900/55* (2013.01)

(58) Field of Classification Search
CPC .. E05F 15/689; E05F 15/695; E05Y 2900/55; E05Y 2400/86
See application file for complete search history.

(56) References Cited

U.S. PATENT DOCUMENTS

| | | | |
|---|---|---|---|
| 5,661,385 A | 8/1997 | McEwan | |
| 5,760,554 A * | 6/1998 | Bustamante | ........... H03K 17/96 318/280 |
| 6,157,372 A * | 12/2000 | Blackburn | .......... G06F 3/04883 345/157 |
| 6,657,140 B2 | 12/2003 | Rantet | |
| 7,002,089 B2 * | 2/2006 | Stevenson | ............ H01H 13/702 200/312 |
| 7,410,202 B2 | 8/2008 | Rose et al. | |

(Continued)

FOREIGN PATENT DOCUMENTS

| | | |
|---|---|---|
| EP | 1515211 A1 | 3/2005 |
| EP | 2639121 A3 | 4/2018 |

(Continued)

OTHER PUBLICATIONS

Vehicle Owner's Manual excerpt, date publicly available prior to Jun. 16, 2017.

(Continued)

*Primary Examiner* — Justin B Rephann
(74) *Attorney, Agent, or Firm* — Lorenz & Kopf, LLP (57) ABSTRACT

Systems and methods are provided for controlling a movement of a window of a vehicle to a selected position. The method includes receiving, by a processor, an input from a source that indicates the selected position for the window, and determining, by the processor, a coordinate location value based on the selected position. The method also includes determining, by the processor, a position for the window based on the coordinate location value and outputting, by the processor, one or more control signals to a motor associated with a window regulator of the window to move the window to the position.

12 Claims, 7 Drawing Sheets

(56) References Cited

U.S. PATENT DOCUMENTS

| | | | |
|---|---|---|---|
| 8,143,832 B2 * | 3/2012 | Holzmann | E05F 15/695 318/266 |
| 10,233,686 B2 | 3/2019 | Smith | |
| 10,329,829 B2 | 6/2019 | Matsui | |
| 2003/0001724 A1 | 1/2003 | Willats | |
| 2003/0047430 A1 * | 3/2003 | Rantet | H01H 13/702 200/5 R |
| 2006/0191204 A1 | 8/2006 | Herwig | |
| 2007/0182215 A1 | 8/2007 | Rose | |
| 2007/0255468 A1 | 11/2007 | Strebel et al. | |
| 2008/0302014 A1 * | 12/2008 | Szczerba | B60K 35/00 49/31 |
| 2009/0295556 A1 * | 12/2009 | Inoue | E05F 15/46 340/438 |
| 2013/0187889 A1 * | 7/2013 | Pandher | G06F 3/044 345/174 |
| 2013/0283692 A1 | 10/2013 | Zawade | |
| 2014/0000165 A1 | 1/2014 | Patel | |
| 2017/0057357 A1 | 3/2017 | Borghi | |
| 2017/0260795 A1 | 9/2017 | Jergess | |
| 2017/0357438 A1 | 12/2017 | Dixon | |
| 2017/0361685 A1 | 12/2017 | Schwarz | |
| 2018/0337870 A1 | 11/2018 | Schubert | |
| 2019/0005755 A1 | 1/2019 | Snider | |
| 2019/0171024 A1 | 6/2019 | Tumler | |
| 2019/0189087 A1 | 6/2019 | Helot | |
| 2019/0197053 A1 | 6/2019 | Graham | |

FOREIGN PATENT DOCUMENTS

| | | |
|---|---|---|
| WO | 2018002186 A1 | 1/2018 |
| WO | 2019034466 A1 | 2/2019 |

OTHER PUBLICATIONS

Vehicle Owner's Manuel excerpt, date publicly available prior to Jun. 16, 2017.

* cited by examiner

SYSTEMS AND METHODS FOR MEMORY AND TOUCH POSITION WINDOW

TECHNICAL FIELD

The present disclosure generally relates to vehicles, and more particularly relates to systems and methods for a window of a vehicle having one or more user-defined memory positions and for a window of a vehicle that is movable based on touch input.

INTRODUCTION

Generally, certain vehicles, such as motor vehicles, have one or more windows, which are movable between various positions between a fully opened position and a fully closed position. In certain instances, one or more windows of the vehicle may have an express opened or an express closed position, in which the window is substantially automatically movable into the fully opened position or the fully closed position based upon a user's interaction with a button, for example. Often times, however, due to buffeting or other wind noise, a user may not desire the window to expressly open to the full opened position. In other scenarios, a user may desire the window to be expressly open to a position between the fully opened position and the fully closed position. Moreover, in certain instances, the user may have to repeatedly interact with the button to reach a desired position for the window to be between the fully opened position and the fully closed position, which may be frustrating for the user.

Accordingly, it is desirable to provide a system and method for a memory position window that enables a user to define one or more express open positions for a window of the vehicle. It is also desirable to provide the system and method for a touch position window that easily enables a user to select a desired position for the window. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, systems and methods are provided for controlling a movement of a window of a vehicle to a selected position. In one embodiment, the method includes receiving, by a processor, an input from a source that indicates the selected position for the window, and determining, by the processor, a coordinate location value based on the selected position. The method also includes determining, by the processor, a position for the window based on the coordinate location value and outputting, by the processor, one or more control signals to a motor associated with a window regulator of the window to move the window to the position.

The receiving the input from the source that indicates the selected position for the window further comprises: receiving, by the processor, an input to a touch bar associated with the vehicle. The determining the coordinate location value further comprises: determining, by the processor, the coordinate location value of the input on the touch bar. The determining the position for the window based on the coordinate location value further comprises: retrieving, by the processor, a window position value from a table datastore based on the coordinate location value. The method further comprises: receiving, by the processor, a second input from a second source for selecting a user-defined position for the window; receiving, by the processor, a source of user identification that identifies the user of the vehicle; retrieving, by the processor, the user-defined position for the window based on the second input and the identified user of the vehicle; and outputting, by the processor, the one or more control signals to the motor associated with the window regulator of the window to move the window to the user-defined position. The method further comprises: receiving, by the processor, the second input from the second source for a period of time greater than a first threshold period of time; receiving, by the processor, one or more sensor signals that indicate a current position of the window; associating, by the processor, the current position of the window as the user-defined position for the second input received from the second source for the identified user; and storing, by the processor, the association in a datastore. The second source is an input button.

In one embodiment, a system for controlling a movement of a window of a vehicle to a selected position includes a source of input that indicates the selected position for the window. The system also includes a controller, having a processor that is configured to: determine a coordinate location value based on the selected position; determine a position for the window based on the coordinate location value; and output one or more control signals to a motor associated with a window regulator of the window to move the window to the position.

The source of input is a touch bar associated with the vehicle. The processor is configured to determine the coordinate location value based on the selected position received as input to the touch bar. The touch bar has a first end, a second end opposite the first end and defines a length between the first end and the second end. A plurality of coordinate location values are defined on the touch bar from the first end to the second end. Each of the plurality of coordinate location values are associated with a plurality of positions of the window. The processor is configured to retrieve a window position value from a table datastore based on the coordinate location value and to process the window position value to determine the position for the window. The processor is configured to: receive a second input from a second source for selecting a user-defined position for the window; receive a source of user identification that identifies the user of the vehicle; retrieve the user-defined position for the window based on the second input and the identified user of the vehicle; and output the one or more control signals to the motor associated with the window regulator of the window to move the window to the user-defined position. The processor is configured to: receive the second input from the second source for a period of time greater than a first threshold period of time; receive one or more sensor signals that indicate a current position of the window; associate the current position of the window as the user-defined position for the second input received from the second source for the identified user; and store the association in a datastore. The second source is an input button.

Also provided according to various embodiments is a vehicle having a window and a system for controlling a movement of a window of a vehicle to a selected position. The vehicle includes a touch bar that receives input that indicates a selected position for the window. The vehicle includes a first input button that receives input that indicates a selected predefined position for the window and a second input button that receives input that indicates a selected user-defined position for the window. The vehicle includes a controller, having a processor that is configured to: based on input received to the touch bar that indicates the selected position for the window, determine a coordinate location value based on the selected position received as the input to the touch bar, determine a position for the window based on the coordinate location value and output one or more control signals to a motor associated with a window regulator of the window to move the window to the position; based on input that indicates the selected predefined position for the window, output the one or more control signals to the motor associated with the window regulator of the window to move the window to the selected predefined position for the window; and based on input received that indicates the selected user-defined position, receive a source of user identification that identifies the user of the vehicle, retrieve the user-defined position for the window based on the second input and the identified user of the vehicle and output the one or more control signals to the motor associated with the window regulator of the window to move the window to the user-defined position.

The processor is configured to determine the coordinate location value based on the selected position received as input to the touch bar. The touch bar has a first end, a second end opposite the first end and defines a length between the first end and the second end. A plurality of coordinate location values are defined on the touch bar from the first end to the second end. Each of the plurality of coordinate location values are associated with a plurality of positions of the window. The processor is configured to retrieve a window position value from a table datastore based on the coordinate location and to process the window position value to determine the position for the window. The processor is configured to: receive the input from the second input button for a period of time greater than a first threshold period of time; receive one or more sensor signals that indicate a current position of the window; associate the current position of the window as the user-defined position for the second input button for the identified user; and store the association in a datastore.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the vehicle systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
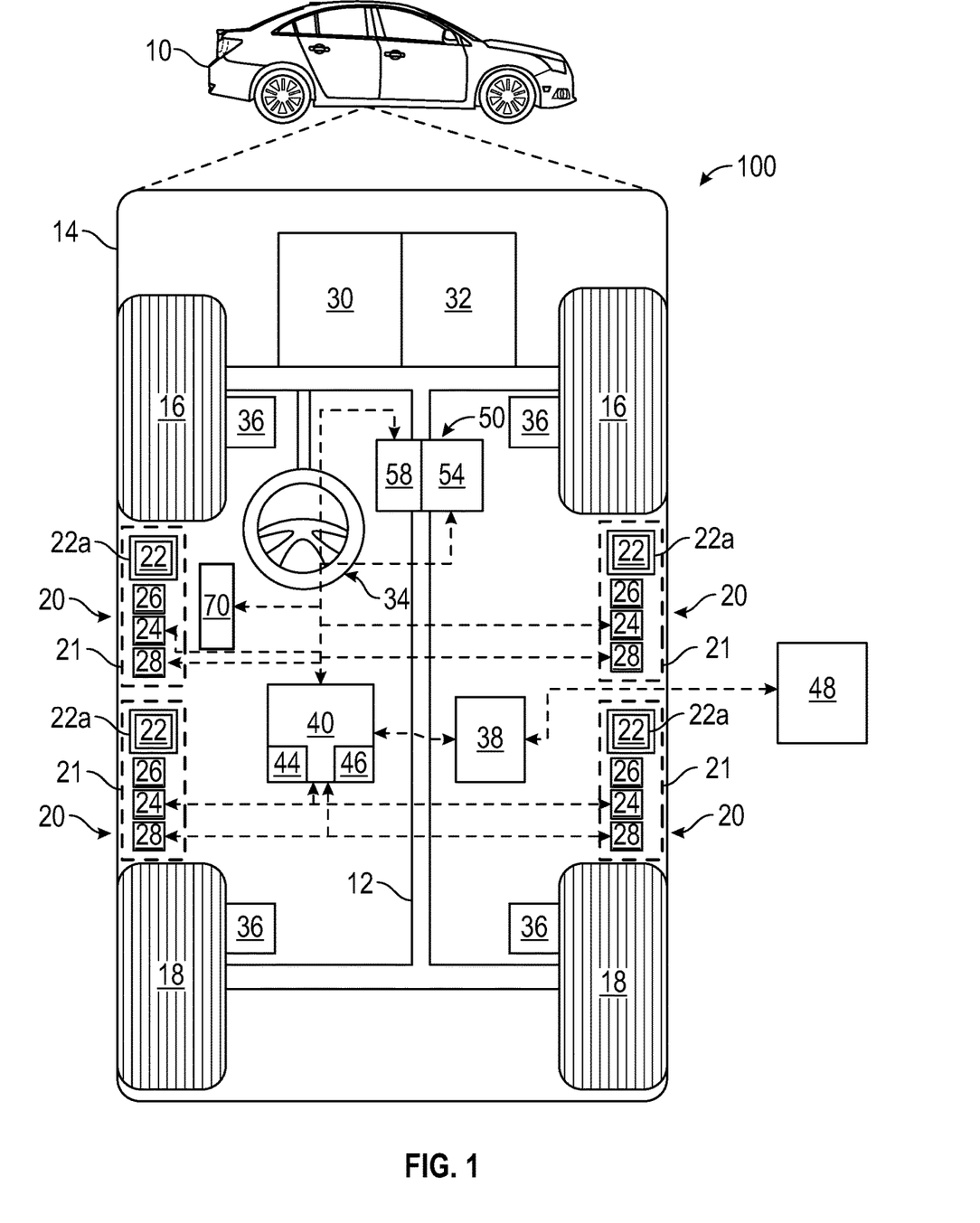
FIG. 1 is a functional block diagram illustrating a vehicle having a window touch and memory position system, in accordance with various embodiments.

With reference to FIG. 1, a window touch and memory position system shown generally at 100 is associated with a vehicle 10 in accordance with various embodiments. In general, the window touch and memory position system 100 includes one or more window systems 20 and a human-machine interface 50. The window touch and memory position system 100 enables a user to store one or more user-defined positions for the window, and enables a user to select a position for the window by input to a touch bar. By enabling a user to store one or more user-defined positions for a window, a user may store a window position between a fully opened and a fully closed position, which increases user satisfaction and comfort. Further, the use of the touch bar enables a user to select a position for the window without requiring multiple manipulations of a button, for example, to arrive at the user's desired location. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 10 generally includes a chassis 12, a body 14, front wheels 16, and rear wheels 18. In certain embodiments, the vehicle 10 may be an autonomous vehicle that is capable of sensing its environment and navigating with little or no user input. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the vehicle 10 includes the one or more window systems 20. Each of the window systems 20 is coupled to a portion of body 14, including, but not limited to one or more doors 21, a roof, tailgate, etc., of the body 14. The window systems 20 each include a window 22, a motor 24, a window regulator 26 and a position sensor 28.

The window 22 comprises any suitable glass or composite panel, which is received within and movable relative to a window frame 22a defined in the body 14. The motor 24 is in communication with a controller 40 over a suitable communication medium that enables the transfer of data, commands, power, etc. The motor 24 is responsive to one or more control signals received from the controller 40 of the vehicle 10 to drive the window regulator 26, in turn moving the window 22 relative to the window frame 22a. Generally, the motor 24 is an electric motor, and a current of the motor 24 is communicated to the controller 40 over the communication medium.

The window regulator 26 is coupled to the window 22 and is coupled to the motor 24. In one example, the window regulator 26 is a cable-driven regulator, which has a series of cables that are movable fore and aft to move the window 22 between the various positions. In this example, the window regulator 26 includes a drive mechanism, such as a worm gear and one or more driven gears. An output shaft of the motor 24 is coupled to the worm gear, and the rotation of the worm gear by the output shaft drives the one or more driven gears. The one or more driven gears, in turn, pull the cables to move the window 22 between the fully opened position, the fully closed position and various positions in-between.

The position sensor 28 observes a position of the window 22 and generates sensor signals based thereon. The position sensor 28 may comprise a linear variable differential transformer (LVDT), which measures a linear displacement or position of the window 22. In other embodiments, the position sensor 28 may comprise a rotary encoder, which observes a position of the output shaft of the motor 24 and generates sensor signals based thereon. The controller 40 is in communication with the position sensor 28 over a suitable communication medium that enables the transfer of data, commands, power, etc. As will be discussed, the controller 40 processes the sensor signals from the position sensor 28 to determine a current position of the window 22.

Figure 1A:
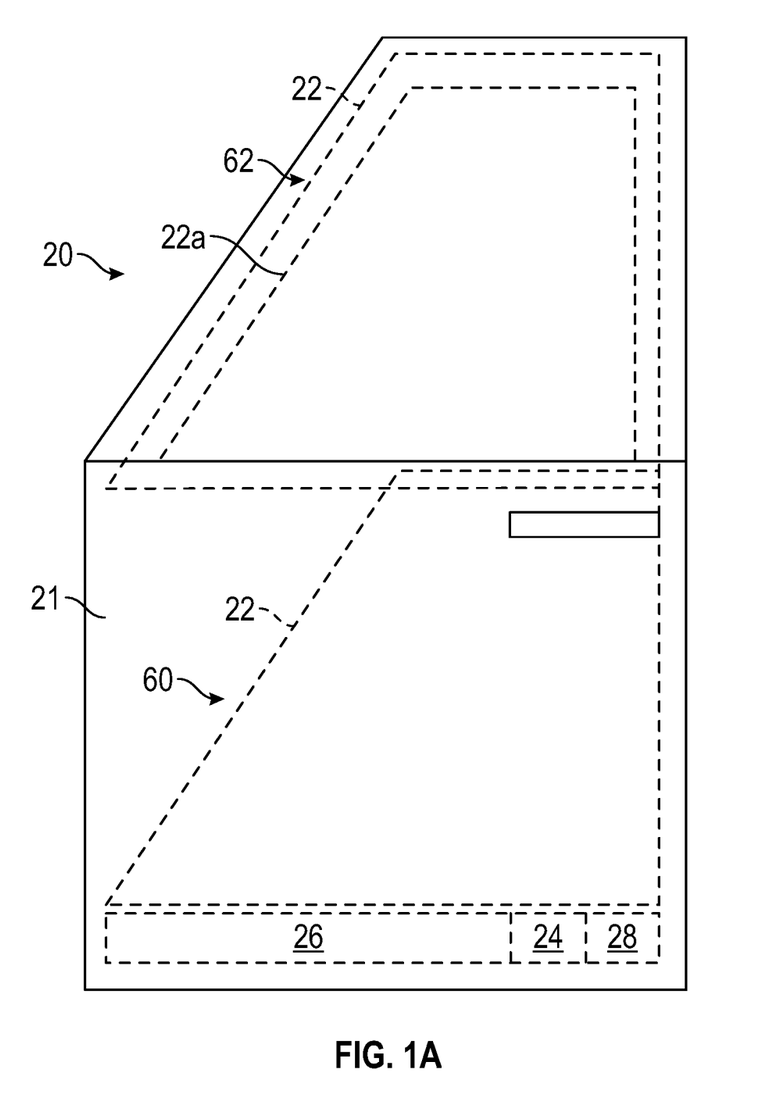
FIG. 1A is a schematic illustration of an exemplary window of the vehicle that is movable between a first, fully opened position, a second, fully closed position and various positions in-between by the window touch and memory position system of FIG. 1.

Thus, in the example of the window systems 20 coupled to respective ones of the doors 21, with reference to FIG. 1A, the motor 24 drives the window regulator 26 relative to the window frame 22a defined within the respective door 21 between a first, fully opened position 60, a second, fully closed position 62 and various positions in-between to enable air to enter into the cabin and/or to enable access to an environment surrounding the vehicle 10. In the fully opened position 60, the window 22 is moved within the window frame 22a to a position in which the window 22 is substantially positioned within the door 21 or is fully recessed within the door 21. In the fully closed position, the window 22 is advanced within the window frame 22a such that the window 22 and the window frame 22a cooperate to seal a cabin of the vehicle 10 from the environment surrounding the vehicle 10. The window 22 is also movable by the motor 24, via the window regulator 26, to various positions between the fully opened position 60 and the fully closed position 62.

With reference to FIG. 1, the vehicle 10 is depicted in the illustrated embodiment as a passenger car, but it should be appreciated that any other vehicle including trucks, sport utility vehicles (SUVs), recreational vehicles (RVs), marine vessels, aircraft, etc., can also be used. As shown, the vehicle 10 generally includes a propulsion system 30, a transmission system 32, a steering system 34, a brake system 36, a communication system 38, a controller 40 and a human-machine interface 50. The propulsion system 30 may, in various embodiments, include an internal combustion engine, an electric machine such as a traction motor, and/or a fuel cell propulsion system. The transmission system 32 is configured to transmit power from the propulsion system 30 to the wheels 16-18 according to selectable speed ratios. According to various embodiments, the transmission system 32 may include a step-ratio automatic transmission, a continuously-variable transmission, or other appropriate transmission. The brake system 36 is configured to provide braking torque to the wheels 16-18 and/or the transmission system 32. The brake system 36 may, in various embodiments, include friction brakes, brake by wire, a regenerative braking system such as an electric machine, and/or other appropriate braking systems. The steering system 34 influences the course of travel by the vehicle 10, for example by adjusting a position of the wheels 16-18. While depicted as including a steering wheel for illustrative purposes, in some embodiments contemplated within the scope of the present disclosure, the steering system 34 may not include a steering wheel.

The communication system 38 is configured to wirelessly communicate information to and from other entities 48, such as but not limited to, other vehicles ("V2V" communication,) infrastructure ("V2I" communication), remote systems, personal devices, and/or a key fob associated with the vehicle 10. In one example, the other entities 48 provide a source of user identification for the vehicle 10. In this regard, a key fob may indicate whether the key fob is associated with a first user or a second user. As will be discussed herein, the user identification enables the window touch and memory position system 100 to store memory positions or preferences for each particular user associated with the vehicle 10. It should be understood, however, that the user identification and/or user preferences may be received from personal devices and/or remote systems. In an exemplary embodiment, the communication system 38 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The controller 40 includes at least one processor 44 and a computer readable storage device or media 46. The processor 44 can be any custom made or commercially available processor, a central processing unit (CPU), a graphics processing unit (GPU), an auxiliary processor among several processors associated with the controller 40, a semiconductor based microprocessor (in the form of a microchip or chip set), a macro processor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 40 in controlling components associated with the vehicle 10, including components associated with the window touch and memory position system 100.

The instructions may include one or more separate programs, each of which comprises an ordered listing of executable instructions for implementing logical functions. The instructions, when executed by the processor 44, receive and process input signals, perform logic, calculations, methods and/or algorithms for controlling the components of the vehicle 10, and in various embodiments, the processor 44 generates control signals to control a movement of at least one of the windows 22 relative to a respective one of the window frames 22a based on the logic, calculations, methods, and/or algorithms. Although only one controller 40 is shown in FIG. 1, embodiments of the vehicle 10 can include any number of controllers 40 that communicate over any suitable communication medium or a combination of communication mediums and that cooperate to process the sensor signals, perform logic, calculations, methods, and/or algorithms, and generate control signals to control features of the vehicle 10.

In various embodiments, one or more instructions of the controller 40 are associated with the window touch and memory position system 100 and, when executed by the processor 44, the instructions receive and process signals from the position sensor 28 and the human-machine interface 50 to determine various conditions associated with the operation of the vehicle 10. For example, as will be discussed herein, the instructions of the controller 40, when executed by the processor 44, determine whether an input is received for storing a current position of at least one of the windows 22 as a first memory position or a second memory position. In various embodiments, the instructions of the controller 40, when executed by the processor 44, receive and process signals from the position sensor 28 to determine the current position of the at least one of the windows 22. The instructions of the controller 40, when executed by the processor 44, receive an identification of the user of the vehicle 10, and associate the determined position of the at least one of the windows 22 with the first memory position and/or the second memory position for the identified user. In various embodiments, the instructions of the controller 40, when executed by the processor 44, also determine whether input has been received to move the at least one of the windows 22 to the first memory position or the second memory position, and retrieve the first memory position or the second memory position associated with the identified user. The instructions of the controller 40, when executed by the processor 44, generate one or more control signals to the respective one of the motors 24 associated with the at least one of the windows 22 to move the at least one of the windows 22 to the retrieved first memory position or the second memory position.

In various embodiments, the instructions of the controller 40, when executed by the processor 44, determine whether an input is received for moving at least one of the windows 22 relative to a respective one of the window frames 22a to a selected position. In various embodiments, the instructions of the controller 40, when executed by the processor 44, determine a coordinate location value for the selected position. In various embodiments, the instructions of the controller 40, when executed by the processor 44, determine a corresponding window position value based on the coordinate location value. In various embodiments, the instructions of the controller 40, when executed by the processor 44, determine a position to move the at least one of the windows 22 and generate one or more control signals to the respective one of the motors 24 associated with the at least one of the windows 22 to move the at least one of the windows 22 to the selected window location.

The human-machine interface 50 is in communication with the controller 40 via a suitable communication medium that enables the transfer of data, commands, power, etc. The human-machine interface 50 may be configured in a variety of ways. In some embodiments, the human-machine interface 50 may include a touchscreen interface 58 that may be overlaid on the display 54, various switches or levers, one or more buttons, a keyboard, an audible device, a microphone associated with a speech recognition system, or various other human-machine interface devices. In one example, the human-machine interface 50 includes a window position interface 70. While the window position interface 70 is shown herein associated with one of the window systems 20, it will be understood that each of the window systems 20 of the vehicle 10 may include a respective window position interface 70. Moreover, it should be understood that while the window position interface 70 is described herein as receiving input to control a position of one of the window 22 of a single window system 20, the window position interface 70 may be used to control all of the window systems 20 associated with the vehicle 10.

Figure 2:
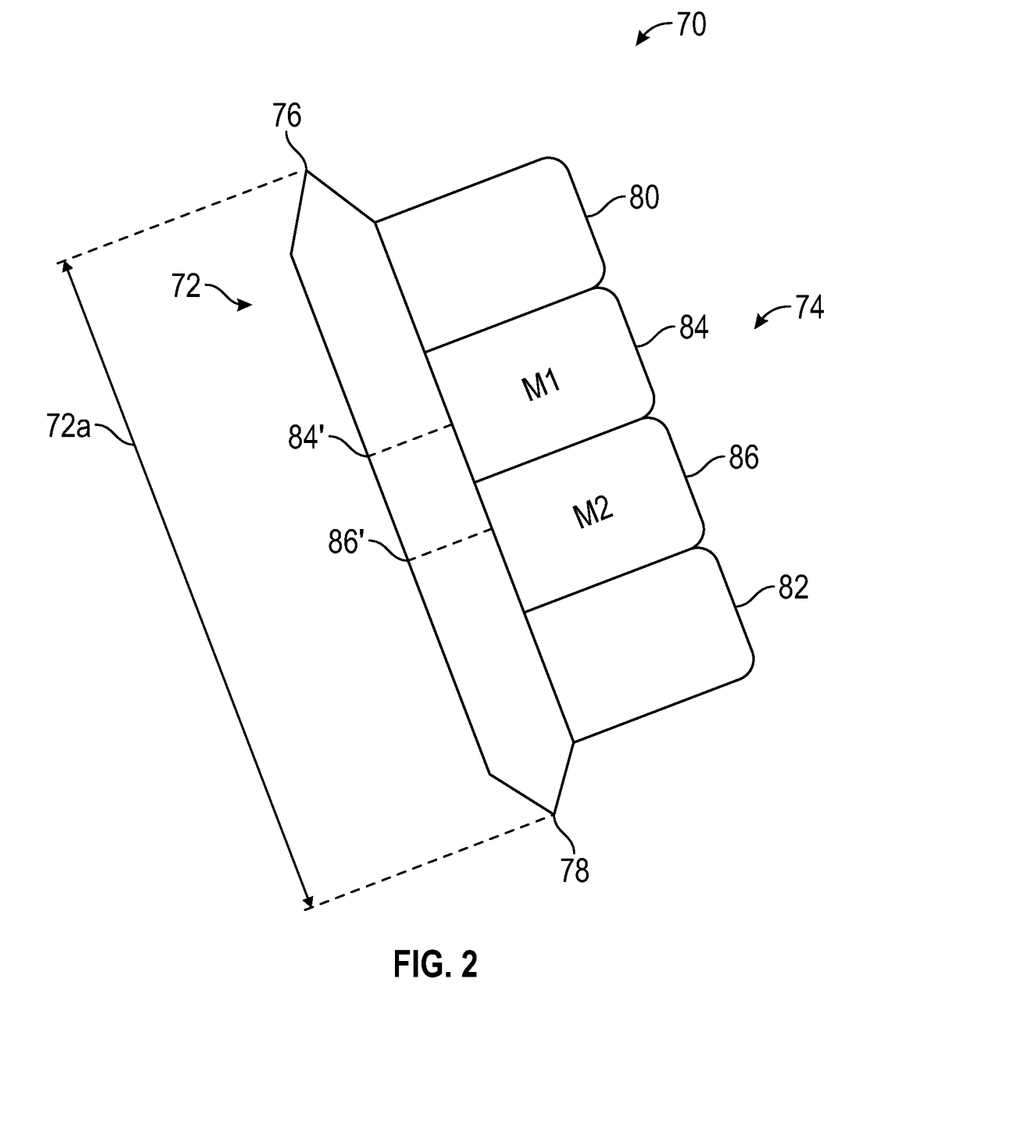
FIG. 2 illustrates an exemplary window position interface for interacting with the window touch and memory position system of the vehicle of FIG. 1.

With reference to FIG. 2, an exemplary window position interface 70 is shown. In this example, the window position interface 70 includes a touch bar 72 and one or more input buttons 74. The touch bar 72 has a first end 76 and a second, opposite end 78. Generally, the touch bar 72 corresponds with a full range of motion for the window 22 relative to the window frame 22a. Thus, the first end 76 corresponds to the fully closed position 62 for the window 22 and the second end 78 corresponds to the fully opened position 60. A length 72a of the touch bar 72 between the first end 76 and the second end 78 corresponds with remaining positions for the movement of the window 22, between the fully closed position 62 and the fully opened position 60.

Thus, the length 72a of the touch bar 72 is calibrated to a full displacement of the window 22 relative to the window frame 22a. The first end 76 of the touch bar 72 is the fully closed position 62 of the window 22 and the second end 78 of the touch bar 72 is the fully opened position 60. Any point along the length 72a of the touch bar 72 is the ratio of the displacement of the window 22. For example, if the touch bar 72 has the length 72a of 100 millimeters (mm) and the total displacement or range of motion for the window 22 is 1000 mm, a finger touch or input from the user on the touch bar 72 at a point that is 10 mm from the first end 76 of the touch bar 72 would result in the window 22 being moved to a position 100 mm below the fully closed position 62. Thus, the ratio or scaling factor for the length 72a of the touch bar 72 to the position of the window 22 in this example is 0.1.

Stated another way, if the first end 76 is considered a (0,0) value (for the fully closed position 62) and the second end 78 is considered a (0,100) value (for the fully opened position 60), a position on the touch bar 72 between (0,0) and (0,100) would correspond to a respective position for the window 22 between the fully closed position 62 and the fully opened position 60 within the window frame 22a. Under this example, a position halfway between the first end 76 and the second end 78 would be a (0,50) value, and would correspond with a midway position for the window 22 between the fully opened position 60 and the fully closed position 62, etc.

The touch bar 72 receives input, such as a request for the movement of the window 22 to a selected position. The touch bar 72 may include, but is not limited to, a resistive touchscreen panel, a capacitive touchscreen panel, a projected capacitance touchscreen panel, a surface capacitive touchscreen panel, a surface acoustic wave touchscreen panel, etc. In one example, the touch bar 72 is a capacitive touchscreen, which is responsive to a user's touch such as a touch by a user's finger, for example. Generally, upon the receipt of the touch or input from the user, the touch bar 72 transmits a signal to the controller 40. The touch bar 72 may receive a point touch from the user, or may receive a sliding touch from the user in which the user touches the touch bar 72 over a series of substantially connected points. As will be discussed, the controller 40 processes the signal, and determines a coordinate location of the touch or input on the touch bar 72. In the example of a sliding touch or input received to the touch bar 72 over a series of substantially connected points, the controller 40 may process the last known input (i.e. the end of the travel of the user's motion along the touch bar 72) to determine the coordinate location of the touch input on the touch bar 72.

The input buttons 74 include a fully closed position input button 80, a fully opened position input button 82, a first memory position input button 84 and a second memory position input button 86. The user manipulates the input buttons 74, via depression for example, to select one of the predefined positions (i.e. the fully closed position or the fully opened position) or the memory positions (i.e. the first memory position or the second memory position). The fully closed position input button 80 corresponds with the fully closed position 62 of the window 22, and the fully opened position input button 82 corresponds with the fully opened position 60 of the window 22. The first memory position input button 84 and the second memory position input button 86 each correspond with a respective user-defined position for the window 22. The first memory position input button 84 and the second memory position input button 86 are each also responsive to an input for a predetermined period of time that indicates a user's desire to set the current window position as a respective one of the first memory position or the second memory position.

Thus, each of the input buttons 74 are responsive to input from a user to transmit a signal to the controller 40 indicating the user's selection of the fully closed position 62, the fully opened position 60, the first memory position or the second memory position for the window 22. In addition, based on a length of time the first memory position input button 84 and the second memory position input button 86 are depressed or input is received to either of the first memory position input button 84 and the second memory position input button 86, the controller 40 associates the current position of the window 22 as the first memory position and/or the second memory position for an identified user.

It should be noted that the use of the input buttons 74 is merely exemplary, as the touch bar 72 may include one or more predefined positions that correlate with the one or more input buttons 74. Stated another way, the touch bar 72 may include one or more lines that correspond with a first memory position 84', a second memory position 86', etc. In addition, although embodiments are discussed herein with regard to touch bar 72 and input buttons 74 as an exemplary window position interface 70, other user input devices may provide input data in various embodiments, including, but not limited to the touchscreen interface 58 of the human-machine interface 50. Moreover, while the touch bar 72 is described herein as including a touchscreen panel, in various embodiments, the touch bar 72 may comprise a sliding electrical switch, a sliding mechanical switch, electro-mechanical sliding switch, etc.

The display 54 comprises any suitable technology for displaying information, including, but not limited to, a liquid crystal display (LCD), organic light emitting diode (OLED), plasma, or a cathode ray tube (CRT). In this example, the display 54 is an electronic display capable of graphically displaying one or more user interfaces under the control of the controller 40. Those skilled in the art may realize other techniques to implement the display 54 in the vehicle 10.

As discussed above, the window touch and memory position system 100 receives input from an occupant of the vehicle 10 for a selected position of at least one of the windows 22. Based on input received from the input buttons 74, the window touch and memory position system 100 generates one or more control signals to the motor 24 to move the window 22 to the selected position. In addition, based on input received from the input buttons 74, the window touch and memory position system 100 associates a current position of the window 22 with the first memory position and/or the second memory position for an identified user and stores this association in a datastore. The window touch and memory position system 100, based on input received from the touch bar 72, also generates one or more control signals to the motor 24 to move the window 22 to the selected position received as input to the touch bar 72.

Figure 3:
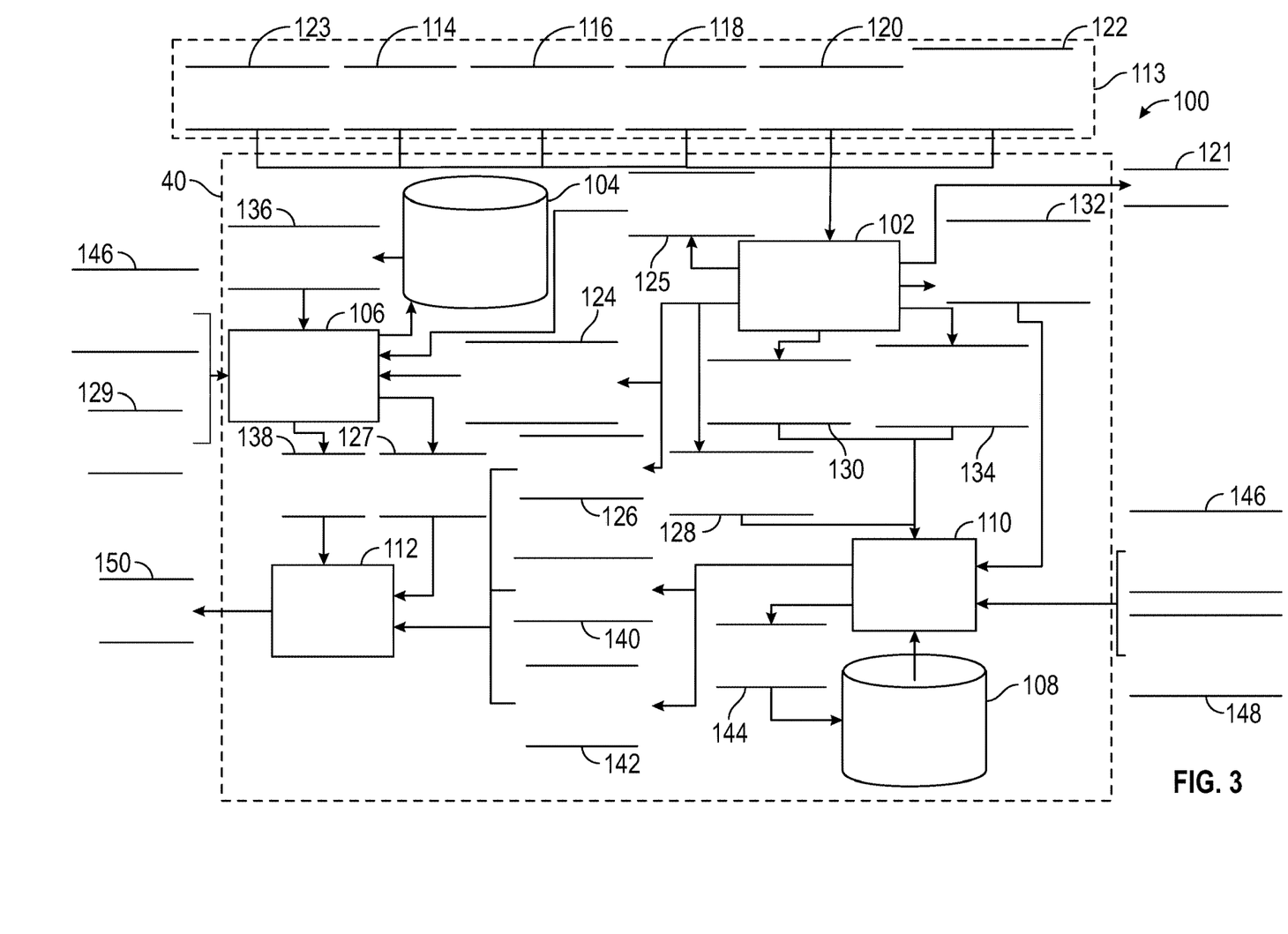
FIG. 3 is a dataflow diagram illustrating the window touch and memory position system of the vehicle of FIG. 1, in accordance with various embodiments.

For example, as shown in more detail with regard to FIG. 3 and with continued reference to FIG. 1, a dataflow diagram illustrates various embodiments of the window touch and memory position system 100 for the vehicle 10, which may be embedded within the controller 40. Various embodiments of the window touch and memory position system 100 according to the present disclosure can include any number of sub-modules embedded within the controller 40. As can be appreciated, the sub-modules shown in FIG. 3 can be combined and/or further partitioned to similarly control the motor 24 of the at least one window 22. Inputs to the window touch and memory position system 100 may be received from the human-machine interface 50, such as the touch bar 72 and/or the input buttons 74, (FIG. 1), received from the position sensor 28 (FIG. 1) associated with the at least one window 22, received from other control modules (not shown) associated with the vehicle 10, and/or determined/modeled by other sub-modules (not shown) within the controller 40. In various embodiments, the window touch and memory position system 100 includes a user interface (UI) control module 102, a table datastore 104, a position determination module 106, a user preferences datastore 108, a memory manager module 110 and a window control module 112.

The UI control module 102 receives input data 113. The input data 113 is received from a user's interaction with the human-machine interface 50. In this example, the input data 113 is received from the user's interaction with the window position interface 70. The input data 113 comprises touch bar input data 114, fully closed input data 116, fully opened input data 118, first memory input data 120, second memory input data 122 and calibration request data 123. The touch bar input data 114 comprises one or more signals from the touch bar 72. The UI control module 102 processes the one or more signals, and determines an (X, Y) coordinate value for the location of the input received to the touch bar 72. In the example of a projected capacitive touchscreen, conductors generally run at right angles to each other and the conductors in each layer are separate such that a capacitance of each conductor is measured separately and the measurement signals are output from the touch bar 72 to the UI control module 102. The UI control module 102 processes these signals from the touch bar 72 and determines the (X, Y) coordinate value for the location that is touched by the user. In the example of input received to the touch bar 72 over a series of substantially connected points, the UI control module 102 processes the last known input received to the touch bar 72 (i.e. the end of the travel of the user's motion along the touch bar 72) to determine the (X, Y) coordinate value for the location that is touched by the user. The UI control module 102 sets the (X,Y) coordinate value for the location touched by the occupant as a touch bar coordinate location value 124 for the position determination module 106.

The UI control module 102 also receives as input the fully closed input data 116. The fully closed input data 116 comprises input received from the fully closed position input button 80. Based on the fully closed input data 116, the UI control module 102 sets a predefined position 126 as the fully closed position 62 for the window control module 112. The UI control module 102 also receives as input the fully opened input data 118. The fully opened input data 118 comprises input received from the fully opened position input button 82. Based on the fully opened input data 118, the UI control module 102 sets the predefined position 126 as the fully opened position 60 for the window control module 112.

The UI control module 102 receives as input the first memory input data 120. The first memory input data 120 comprises input received from the first memory position input button 84. Based on the first memory input data 120, the UI control module 102 determines whether a period of time the input from the first memory position input button 84 is received is greater than a first threshold period of time. In one example, the first threshold period of time is about 10 seconds (s). If true, the method sets a first memory store request 128 for the memory manager module 110. The first memory store request 128 comprises a request to associate a current position of the window 22 with the first memory position input button 84.

If the period of time the input from the first memory position input button 84 is received is less than the first threshold period of time, the UI control module 102 sets first memory selection data 130 for the memory manager module 110. The first memory selection data 130 comprises a request to move the window 22 to the position associated with the first memory position input button 84 for an identified user.

The UI control module 102 receives as input the second memory input data 122. The second memory input data 122 comprises input received from the second memory position input button 86. Based on the second memory input data 122, the UI control module 102 determines whether a period of time the input from the second memory position input button 86 is received is greater than the first threshold period of time. If true, the method sets a second memory store request 132 for the memory manager module 110. The second memory store request 132 comprises a request to associate a current position of the window 22 with the second memory position input button 86.

If the period of time the input from the second memory position input button 86 is received is less than the first threshold period of time, the UI control module 102 sets second memory selection data 134 for the memory manager module 110. The second memory selection data 134 comprises a request to move the window 22 to the position associated with the second memory position input button 86 for an identified user.

The UI control module 102 receives as input the calibration request data 123. The calibration request data 123 is input received to the human-machine interface 50 to calibrate the touch bar 72 with the various positions of the window 22. Based on the receipt of the calibration request data 123, the UI control module 102 sets calibration request 125 for the position determination module 106. The calibration request 125 indicates that a calibration of the touch bar 72 is requested. Based on the receipt of the calibration request 125, the UI control module 102 may output user interface data 121 for rendering a user interface on the display 54 that graphically and/or textually instructs the user to contact the first end 76 of the touch bar 72, and to later touch the second end 78 of the touch bar 72 to perform the calibration.

The table datastore 104 stores a correlation table that correlates the (X,Y) coordinate value for the location touched by the occupant on the touch bar 72 to a position for the window 22. Thus, the table datastore 104 stores one or more lookup tables, which provide a window position value 136 that corresponds with the (X,Y) coordinate value for the location touched on the touch bar 72 by the user. In one example, the window position values 136 stored in the table datastore 104 are each predefined factory-set values, or in various embodiments, may be populated by the position determination module 106 during a calibration routine. In this example, the window position value 136 may have a one to one correspondence with the (X,Y) coordinate location value received from the touch bar input data 114. Stated another way, each (X,Y) coordinate location of the touch bar 72 may correspond directly to a respective position for the window 22.

In one example, the position determination module 106 receives as input the calibration request 125 and the touch bar coordinate location value 124 for input received at the first end 76 of the touch bar 72 from the UI control module 110. Based on the calibration request 135, the position determination module 106 sets calibration data 127 for the window control module 112. The calibration data 127 is a command to move the window 22 toward the fully up position or the fully down position. Based on the calibration data 127 indicating a command to move the window 22 to the fully up position, the position determination module 106 receives as input current data 129. The current data 129 is a current of the motor 24, which is output by the motor 24 and/or sensed by a sensor associated with the motor 24. The position determination module 106 processes the current data 129 and determines whether the current of the motor 24 has increased or spiked, which indicates that the window 22 has contacted a portion of the window frame 22a, such as a seal of the window frame 22a. If true, the position determination module 106 receives as input window position sensor data 146. The window position sensor data 146 comprises the one or more signals or sensor data from the position sensor 28. The position determination module 106 processes the window position sensor data 146 to determine the current position of the window 22. The position determination module 106 associates the current position of the window 22 as the window position value 136 associated with the touch bar coordinate location value 124 for input received to the first end 76 of the touch bar 72 and stores this association in the table datastore 104.

Once the position determination module 106 has stored the window position value 136 for the first end 76, the position determination module 106 receives as input the touch bar coordinate location value 124 from the UI control module 102 for input received to the second end 78 of the touch bar 72. The position determination module 106 sets calibration data 127 for the window control module 112 to move the window 22 toward the fully down position. The position determination module 106 receives as input the current data 129. The position determination module 106 processes the current data 129 and determines whether the current of the motor 24 has increased or spiked, which indicates that the window 22 has contacted a portion of the window frame 22a, such as a seal of the window frame 22a. If true, the position determination module 106 receives as input window position sensor data 146. The position determination module 106 processes the window position sensor data 146 to determine the current position of the window 22. The position determination module 106 associates the current position of the window 22 as the window position value 136 associated with the touch bar coordinate location value 124 for input received to the second end 78 of the touch bar 72 and stores this association in the table datastore 104.

Based on the window position values 136 for input received to the first end 76 and the second end 78 of the touch bar 72, and the touch bar coordinate location values 124 of the first end 76 and the second end 78 of the touch bar 72, the position determination module 106 scales the remaining window position values 136 to associate a particular coordinate location on the touch bar 72 with a particular window position. In one example, the position determination module 106 subtracts the window position value 136 associated with input received to the first end 76 from the window position value 136 associated with the second end 78 to determine a length of travel for the window 22. The position determination module 106 subtracts the touch bar coordinate location value 124 for the first end 76 from the touch bar coordinate location value 124 for the second end 78 to determine a length of the touch bar 72. The position determination module 106 divides the length of travel of the window 22 by the length of the touch bar 72 to determine a ratio of the movement or a scaling factor. Based on the scaling factor, the position determination module 106 calculates the window position values 136 between the fully closed position and the fully closed position that correspond with touch bar coordinate location values 124 between the touch bar coordinate location value 124 for the first end 76 and the touch bar coordinate location value 124 for the second end 78. The position determination module 106 stores the calculated window position values 136 in the table datastore 104.

The position determination module 106 also receives as input the touch bar coordinate location value 124. Based on the touch bar coordinate location value 124, the position determination module 106 retrieves the corresponding window position value 136 from the table datastore 104. The position determination module 106 processes the window position value 136 and sets the window position value 136 as a position 138 for the window control module 112. The position 138 is the corresponding position for the window 22 relative to the window frame 22a based on the input to the touch bar 72.

The user preferences datastore 108 stores one or more look-up tables that provide a first memory position 140 associated with the selection of the first memory position input button 84 and a second memory position 142 associated with the selection of the second memory position input button 86 for a particular user of the vehicle 10. Thus, the one or more lookup tables store data of a user preference 144 for the position of the window 22 associated with the first memory position input button 84 and the second memory position input button 86 for one or more uniquely identified users of the vehicle 10. The user preference 144 is populated by a user's interaction with the window position interface 70, however, one or more of the user preferences 144 may be predefined or default values. Further, in certain embodiments, the user preferences 144 may be received from other entities 48, such as a personal device, in communication with the vehicle 10.

The memory manager module 110 receives as input the first memory store request 128. Based on the first memory store request 128, the memory manager module 110 receives as input window position sensor data 146. The memory manager module 110 processes the window position sensor data 146 to determine the current position of the window 22.

The memory manager module 110 also receives as input user identification data 148. The user identification data 148 is received from other entities 48, such as the key fob associated with the vehicle 10. The user identification data 148 provides a unique identifier of the user of the vehicle 10. The memory manager module 110 processes the user identification data 148 to identify the particular user of the vehicle 10.

The memory manager module 110 associates the current position of the window 22 as the first memory position 140 for the user identified in the user identification data 148. The memory manager module 110 stores the first memory position 140 as the user preference 144 for the first memory position input button 84 for the identified user in the user preferences datastore 108.

The memory manager module 110 receives as input the second memory store request 132. Based on the second memory store request 132, the memory manager module 110 receives the window position sensor data 146. The memory manager module 110 processes the window position sensor data 146 to determine the current position of the window 22. The memory manager module 110 also receives as input user identification data 148, and processes the user identification data 148 to identify the particular user of the vehicle 10.

The memory manager module 110 associates the current position of the window 22 as the second memory position 142 for the user identified in the user identification data 148. The memory manager module 110 stores the second memory position 142 as the user preference 144 for the second memory position input button 86 for the identified user in the user preferences datastore 108.

The memory manager module 110 also receives as input the first memory selection data 130. Based on the first memory selection data 130, the memory manager module 110 receives and processes the user identification data 148 to identify the particular user of the vehicle 10. Based on the identified user, the memory manager module 110 retrieves the user preference 144 associated with the identified user for the first memory position input button 84 from the user preferences datastore 108. The memory manager module 110 sets the first memory position 140 from the user preference 144 for the window control module 112.

The memory manager module 110 receives as input the second memory selection data 134. Based on the second memory selection data 134, the memory manager module 110 receives and processes the user identification data 148 to identify the particular user of the vehicle 10. Based on the identified user, the memory manager module 110 retrieves the user preference 144 associated with the identified user for the second memory position input button 86 from the user preferences datastore 108. The memory manager module 110 sets the second memory position 142 from the user preference 144 for the window control module 112.

The window control module 112 receives as input the position 138. Based on the position 138, the window control module 112 generates and outputs one or more control signals 150 for the motor 24 of the window system 20. The one or more control signals 150 comprise one or more commands to actuate the motor 24 to move the window 22, via the window regulator 26, to the position 138.

The window control module 112 receives as input the calibration data 127. Based on the calibration data 127, the window control module 112 generates and outputs one or more control signals 150 for the motor 24 of the window system 20. The one or more control signals 150 comprise one or more commands to actuate the motor 24 to move the window 22, via the window regulator 26, toward the fully closed position or the fully opened position based on the calibration data 127.

The window control module 112 also receives as input the predefined position 126. Based on the predefined position 126, the window control module 112 generates and outputs the one or more control signals 150 for the motor 24 of the window system 20. In one example, based on the predefined position 126 as the fully opened position 60, the window control module 112 generates and outputs the one or more control signals 150 to actuate the motor 24 to move the window 22, via the window regulator 26, to the fully opened position 60. Similarly, based on the predefined position 126 as the fully closed position 62, the window control module 112 generates and outputs the one or more control signals 150 to actuate the motor 24 to move the window 22, via the window regulator 26, to the fully closed position 62.

The window control module 112 receives as input the first memory position 140. Based on the first memory position 140, the window control module 112 generates and outputs the one or more control signals 150 for the motor 24 of the window system 20. The one or more control signals 150 comprise one or more commands to actuate the motor 24 to move the window 22, via the window regulator 26, to the first memory position 140.

The window control module 112 also receives as input the second memory position 142. Based on the second memory position 142, the window control module 112 generates and outputs the one or more control signals 150 for the motor 24 of the window system 20. The one or more control signals 150 comprise one or more commands to actuate the motor 24 to move the window 22, via the window regulator 26, to the second memory position 142.

Figure 4:
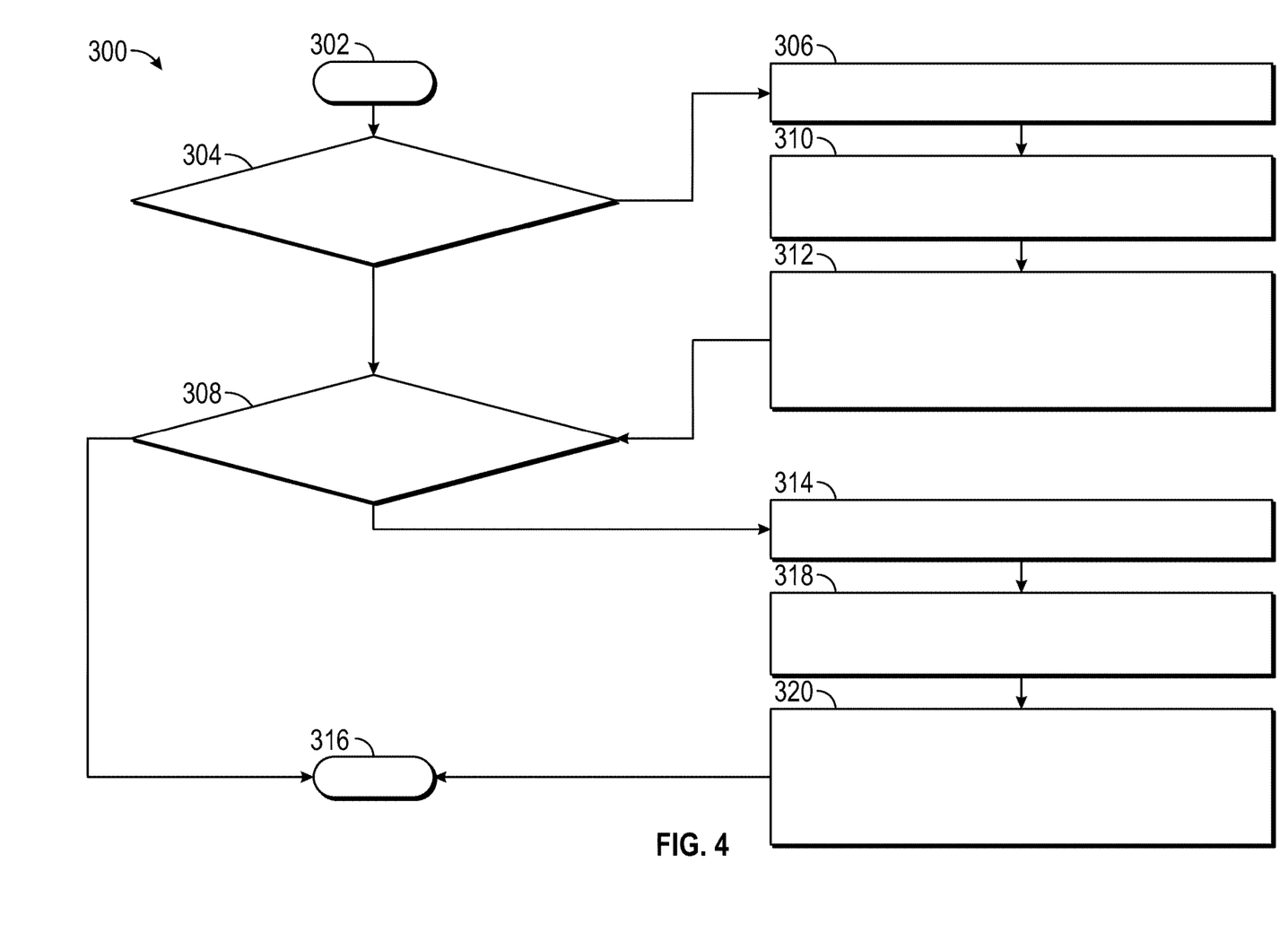
FIG. 4 is a flowchart illustrating a first control method that may be performed by the window touch and memory position system of the vehicle of FIG. 1, in accordance with various embodiments.

Referring now to FIG. 4, and with continued reference to FIGS. 1-3, a flowchart illustrates a method 300 that can be performed by the window touch and memory position system 100 of FIGS. 1-3 to associate a current window position with the first memory position input button 84 and/or second memory position input button 86 in accordance with the present disclosure. In various embodiments, the method 300 is performed by the processor 44 of the controller 40. As can be appreciated in light of the disclosure, the order of operation within the method is not limited to the sequential execution as illustrated in FIG. 4, but may be performed in one or more varying orders as applicable and in accordance with the present disclosure. In various embodiments, the method 300 can be scheduled to run based on one or more predetermined events, and/or can run continuously during operation of the vehicle 10.

The method begins at 302. At 304, the method determines whether an input has been received to store a first memory position. For example, the method determines whether an input received from the first memory position input button 84 has been received for greater than the first threshold period of time. If true, the method proceeds to 306. Otherwise, the method proceeds to 308.

At 306, the method receives the user identification data 148. The method processes the user identification data 148 and identifies the particular user of the vehicle 10. For example, the method processes data from the key fob that uniquely identifies the user associated with the particular key fob. At 310, the method receives and processes the sensor signals or sensor data from the position sensor 28 (i.e. the window position sensor data 146) and determines a current position of the window 22. At 312, the method associates the current position of the window 22 as the first memory position 140 for the identified user, and stores this as the user preference 144 for the first memory position input button 84 in the user preferences datastore 108.

At 308, the method determines whether an input has been received to store a second memory position. For example, the method determines whether an input received from the second memory position input button 86 has been received for greater than the first threshold period of time. If true, the method proceeds to 314. Otherwise, the method ends at 316.

At 314, the method receives the user identification data 148. The method processes the user identification data 148 and identifies the particular user of the vehicle 10. For example, the method processes data from the key fob that uniquely identifies the user associated with the particular key fob. At 318, the method receives and processes the sensor signals or sensor data from the position sensor 28 (i.e. the window position sensor data 146) and determines a current position of the window 22. At 320, the method associates the current position of the window 22 as the second memory position 142 for the identified user, and stores this as the user preference 144 for the second memory position input button 86 in the user preferences datastore 108. The method ends at 316.

Figure 4A:
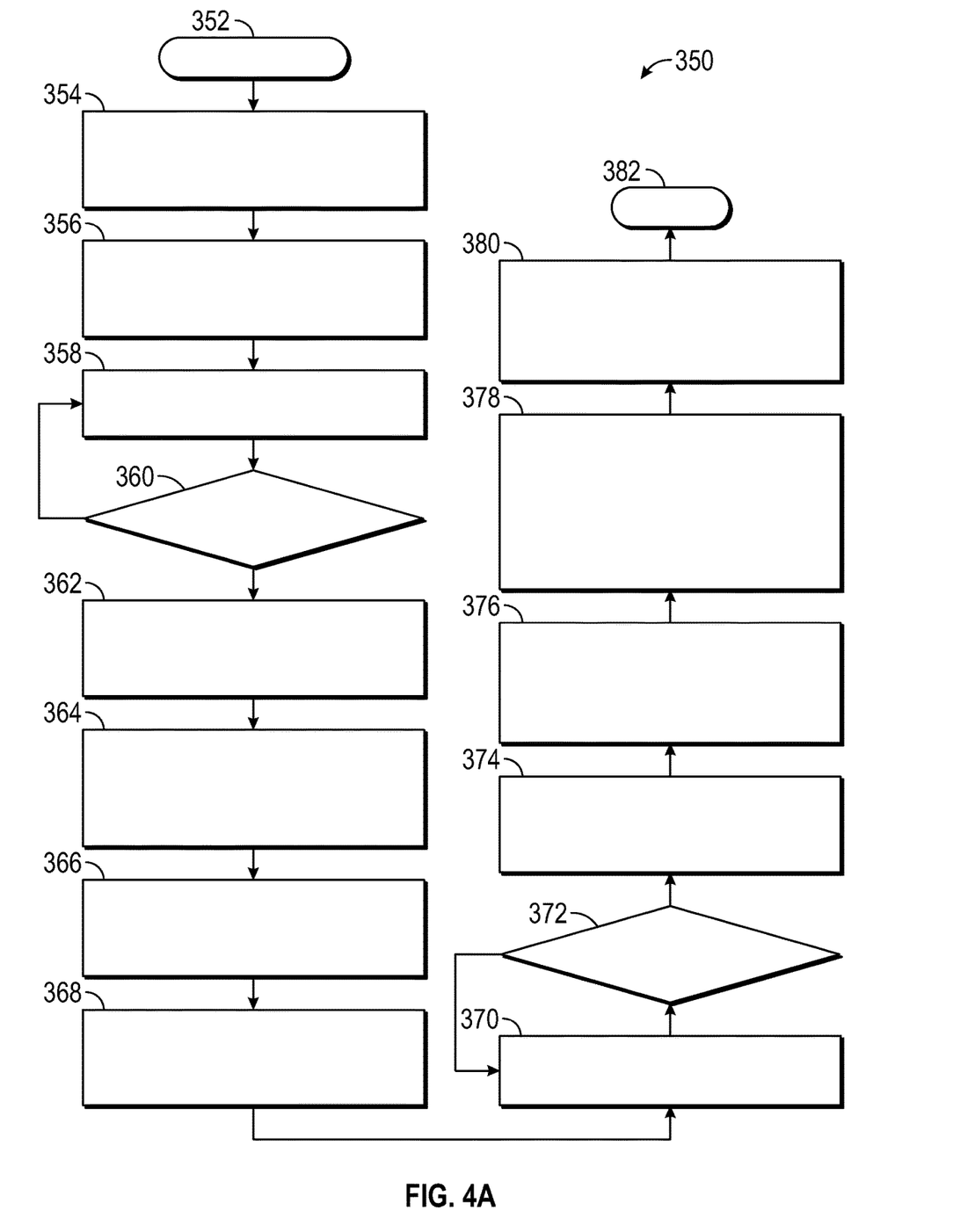
FIG. 4A is a flowchart illustrating a calibration method that may be performed by the window touch and memory position system of the vehicle of FIG. 1, in accordance with various embodiments.

Referring now to FIG. 4A, and with continued reference to FIGS. 1-3, a flowchart illustrates a method 350 that can be performed by the window touch and memory position system 100 of FIGS. 1-3 to calibrate the touch bar 72 to the position of the window 22 in accordance with the present disclosure. In various embodiments, the method 350 is performed by the processor 44 of the controller 40. As can be appreciated in light of the disclosure, the order of operation within the method is not limited to the sequential execution as illustrated in FIG. 4A, but may be performed in one or more varying orders as applicable and in accordance with the present disclosure. In various embodiments, the method 350 can be scheduled to run based on one or more predetermined events, and/or can run based on input received from the human-machine interface 50 (e.g. the calibration request data 123).

The method begins at 352. In various embodiments, the method may generate and output the UI data 121 for rendering a user interface on the display 54 that graphically and/or textually instructs the user to provide input to the first end 76 of the touch bar 72. At 354, the method receives input from the first end 76 of the touch bar 72, and processes the input to determine the touch bar coordinate location value 124. At 356, the method outputs one or more control signals to move the window 22 toward the fully closed position. At 358, the method receives and processes the current data 129. At 360, the method determines whether the current of the motor 24 has increased, which indicates that the window 22 has contacted the window frame 22a. If false, the method loops to 358.

If the current has increased, at 362, the method receives and processes the window position sensor data 146 received from the position sensor 28 to determine the position of the window 22. At 364, the method associates the determined position of the window 22 as the window position value 136 that corresponds to the touch bar coordinate location value 124 for input received to the first end 76 of the touch bar 72 and stores this association in the table datastore 104. In various embodiments, the method may generate and output the UI data 121 for rendering a user interface on the display 54 that graphically and/or textually instructs the user to provide input to the second end 78 of the touch bar 72. At 366, the method receives input from the second end 78 of the touch bar 72, and processes the input to determine the touch bar coordinate location value 124. At 368, the method outputs one or more control signals to move the window 22 toward the fully opened position. At 370, the method receives and processes the current data 129. At 372, the method determines whether the current of the motor 24 has increased, which indicates that the window 22 has contacted the window frame 22a. If false, the method loops to 370.

If the current has increased, at 374, the method receives and processes the window position sensor data 146 received from the position sensor 28 to determine the position of the window 22. At 376, the method associates the determined position of the window 22 as the window position value 136 that corresponds to the touch bar coordinate location value 124 for input received to the second end 78 of the touch bar 72 and stores this association in the table datastore 104. At 378, the method determines the remaining window position values 136 based on the window position values 136 for the input received to the first end 76 and the second end 78 of the touch bar 72, and the associated touch bar coordinate location values 124 for the first end 76 and the second end 78. In one example, the method subtracts the window position value 136 for the input received to the first end 76 from the window position value 136 for the input received to the second end 78 to determine a length of travel of the window. The method subtracts the touch bar coordinate location value 124 for the first end 76 from the touch bar coordinate location value 124 for the second end 78 to determine a length of the touch bar 72. The method divides the length of travel of the window 22 by the length of the touch bar 72 to determine a ratio of the movement or a scaling factor. Based on the scaling factor, the method calculates the window position values 136 between the fully closed position and the fully closed position that correspond with touch bar coordinate location values 124 between the touch bar coordinate location value 124 for the first end 76 and the touch bar coordinate location value 124 for the second end 78. The method stores the calculated window position values 136 in the table datastore 104. The calibration method ends at 382.

Figure 5:
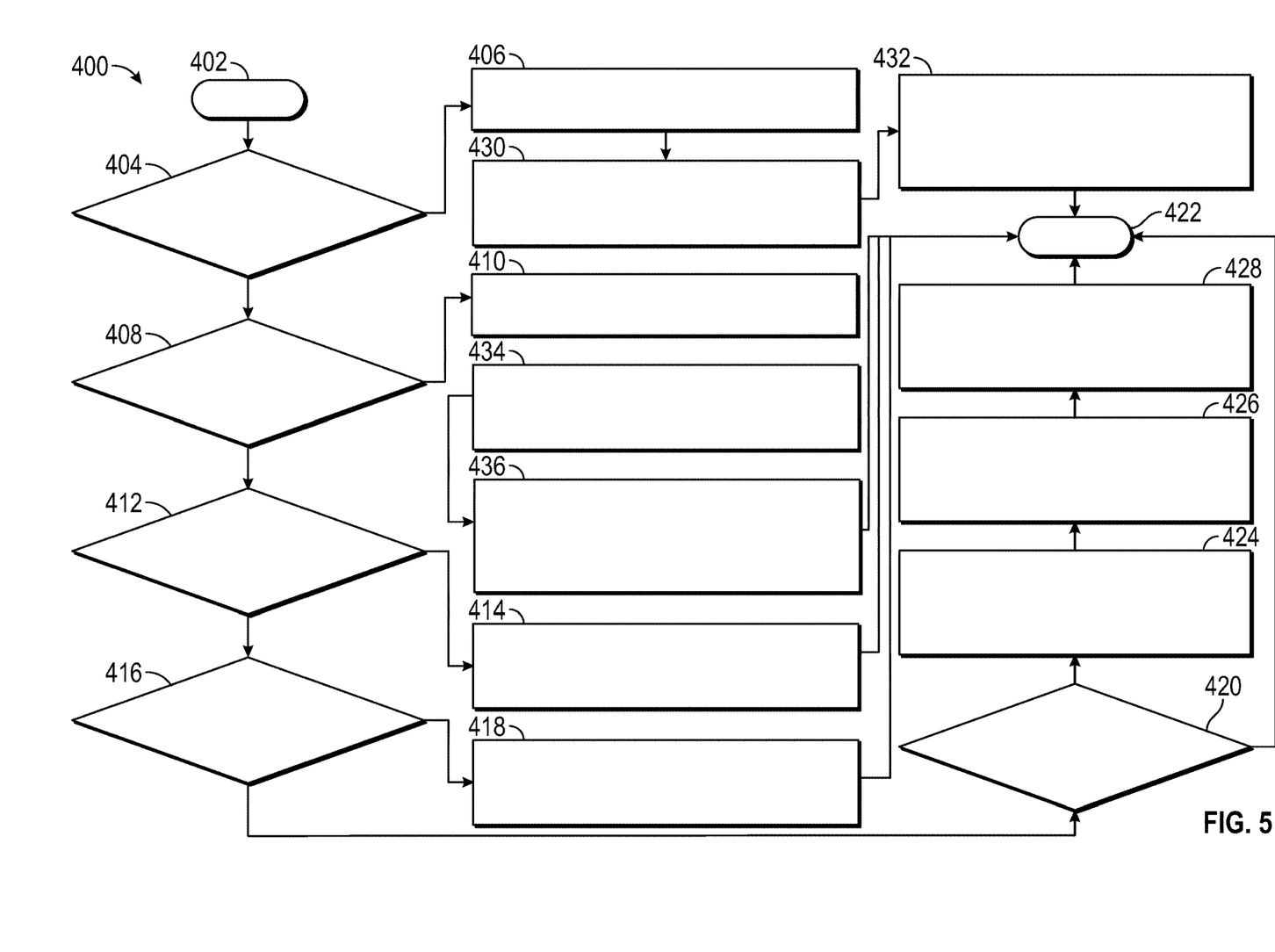
FIG. 5 is a flowchart illustrating a second control method that may be performed by the window touch and memory position system of the vehicle of FIG. 1, in accordance with various embodiments.

Referring now to FIG. 5, and with continued reference to FIGS. 1-3, a flowchart illustrates a method 400 that can be performed by the window touch and memory position system 100 of FIGS. 1-3 to control a movement of at least one of the windows 22 to a selected position in accordance with the present disclosure. In various embodiments, the method 400 is performed by the processor 44 of the controller 40. As can be appreciated in light of the disclosure, the order of operation within the method is not limited to the sequential execution as illustrated in FIG. 5, but may be performed in one or more varying orders as applicable and in accordance with the present disclosure. In various embodiments, the method 400 can be scheduled to run based on one or more predetermined events, and/or can run continuously during operation of the vehicle 10.

The method begins at 402. At 404, the method determines whether input has been received from the first memory position input button 84 that selects the first memory position for the window 22. If true, the method proceeds to 406.

Otherwise, at 408, the method determines whether input has been received from the second memory position input button 86 that selects the second memory position for the window 22. If true, the method proceeds to 410.

Otherwise, at 412, the method determines whether input has been received from the fully closed position input button 80 that selects the fully closed position for the window 22. If true, the method proceeds to 414.

Otherwise, at 416, the method determines whether input has been received from the fully opened position input button 82 that selects the fully opened position for the window 22. If true, the method proceeds to 418.

Otherwise, at 420, the method determines whether input has been received from the touch bar 72. If false, the method ends at 422. Otherwise, if true, the method proceeds to 424. At 424, the method processes the signals received from the touch bar 72 and determines the touch bar coordinate location value 124 for the position of the window 22 selected on the touch bar 72. At 426, the method retrieves the corresponding window position value 136 based on the touch bar coordinate location value 124 and sets the window position value 136 as the position 138 for the window 22. At 428, the method generates and outputs the one or more control signals 150 to the motor 24 to move the window 22 to the determined position 138. The method ends at 422.

At 406, if the input was received from the first memory position input button 84, the method receives the user identification data 148 and processes the user identification data 148 to identify the particular user of the vehicle 10. At 430, the method retrieves the user preference 144 associated with the identified user, including the first memory position 140. At 432, the method generates and outputs the one or more control signals 150 to the motor 24 to move the window 22, via the window regulator 26, to the first memory position 140 associated with the first memory position input button 84 for the identified user. The method ends at 422.

At 410, if the input was received from the second memory position input button 86, the method receives the user identification data 148 and processes the user identification data 148 to identify the particular user of the vehicle 10. At

434, the method retrieves the user preference 144 associated with the identified user, including the second memory position 142. At 436, the method generates and outputs the one or more control signals 150 to the motor 24 to move the window 22, via the window regulator 26, to the second memory position 142 associated with the second memory position input button 86 for identified user. The method ends at 422.

At 414, if the input was received from the fully closed position input button 80, the method sets the predefined position 126 as the fully closed position, and the method generates and outputs the one or more control signals 150 to the motor 24 to move the window 22, via the window regulator 26, to the fully closed position 62. The method ends at 422.

At 418, if the input was received from the fully opened position input button 82, the method sets the predefined position 126 as the fully opened position 60, and the method generates and outputs the one or more control signals 150 to the motor 24 to move the window 22, via the window regulator 26, to the fully opened position 60. The method ends at 422.

Thus, the window touch and memory position system 100 enables a user of the vehicle 10 to store one or more user-defined positions for the window 22 relative to a window frame 22a. Moreover, the window position interface 70 enables the user of the vehicle 10 expressly move the window to various positions, such as the user-defined positions, predefined positions (i.e. the fully closed position and the fully opened position) and various positions in-between. The use of the touch bar 72 enables the user to easily select a position for the window 22 without requiring multiple manipulations of a button, for example, to arrive at the desired position.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling a movement of a window of a vehicle to a selected position, comprising:
   a source of input that indicates the selected position for the window; and
   a controller, having a processor that is configured to:
   determine a coordinate location value based on the selected position;
   determine a position for the window based on the coordinate location value;
   output one or more control signals to a motor associated with a window regulator of the window to move the window to the position;
   receive a second input from a second source for selecting a user-defined position for the window;
   receive a source of user identification that identifies the user of the vehicle;
   retrieve the user-defined position for the window based on the second input and the identified user of the vehicle; and
   output the one or more control signals to the motor associated with the window regulator of the window to move the window to the user-defined position.

2. The system of claim 1, wherein the source of input is a touch bar associated with the vehicle.

3. The system of claim 2, wherein the processor is configured to determine the coordinate location value based on the selected position received as input to the touch bar.

4. The system of claim 3, wherein the touch bar has a first end, a second end opposite the first end and defines a length between the first end and the second end, and a plurality of coordinate location values are defined on the touch bar from the first end to the second end, with each of the plurality of coordinate location values associated with a plurality of positions of the window.

5. The system of claim 3, wherein the processor is configured to retrieve a window position value from a datastore based on the coordinate location value and to process the window position value to determine the position for the window.

6. The system of claim 1, wherein the processor is configured to:
   receive the second input from the second source for a period of time greater than a first threshold period of time;
   receive one or more sensor signals that indicate a current position of the window;
   associate the current position of the window as the user-defined position for the second input received from the second source for the identified user; and
   store the association in a second datastore.

7. The system of claim 6, wherein the second source is an input button.

8. A vehicle having a window and a system for controlling a movement of a window of a vehicle to a selected position, the vehicle comprising:
   a touch bar that receives input that indicates a selected position for the window;
   a first input button that receives input that indicates a selected predefined position for the window;
   a second input button that receives input that indicates a selected user-defined position for the window;
   a controller, having a processor that is configured to:
   based on input received to the touch bar that indicates the selected position for the window, determine a coordinate location value based on the selected position received as the input to the touch bar, determine a position for the window based on the coordinate location value and output one or more control signals to a motor associated with a window regulator of the window to move the window to the position;
   based on input received to the first input button that indicates the selected predefined position for the window, output the one or more control signals to the motor associated with the window regulator of the window to move the window to the selected predefined position for the window; and
   based on a second input received to the second input button that indicates the selected user-defined position for the window, receive a source of user identification that identifies the user of the vehicle, retrieve the user-defined position for the window based on the second input and the identified user of the vehicle and output the one or more control signals to the motor associated with the window regulator of the window to move the window to the user-defined position.

9. The vehicle of claim 8, wherein the processor is configured to determine the coordinate location value based on the selected position received as input to the touch bar.

10. The vehicle of claim 8, wherein the touch bar has a first end, a second end opposite the first end and defines a length between the first end and the second end, and a plurality of coordinate location values are defined on the touch bar from the first end to the second end, with each of the plurality of coordinate location values associated with a plurality of positions of the window.

11. The vehicle of claim 8, wherein the processor is configured to retrieve a window position value from a datastore based on the coordinate location and to process the window position value to determine the position for the window.

12. The vehicle of claim 8, wherein the processor is configured to:
receive the second input from the second input button for a period of time greater than a first threshold period of time;
receive one or more sensor signals that indicate a current position of the window;
associate the current position of the window as the user-defined position for the second input button for the identified user; and
store the association in a second datastore.

* * * * *